INVENTORS
NICHOLAS V. ROSS
MARIO TAMA
BY
J. H. SLOUGH
ATTORNEY

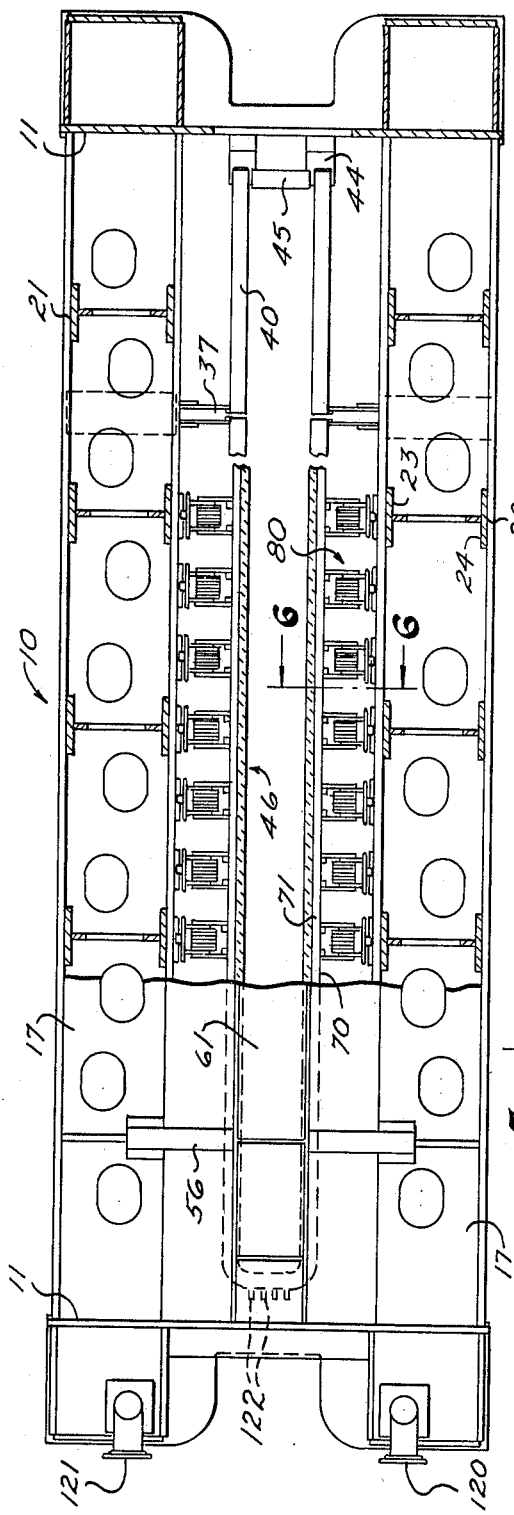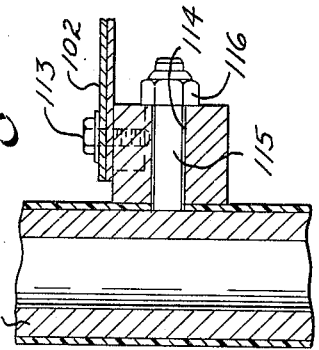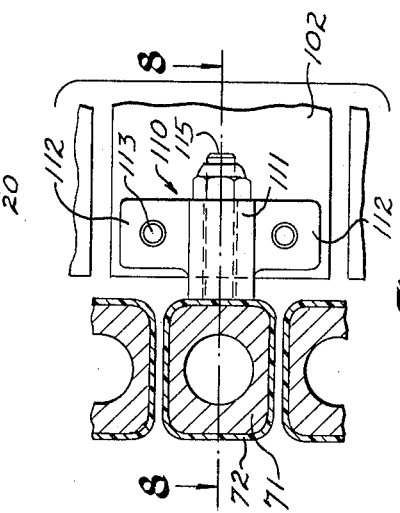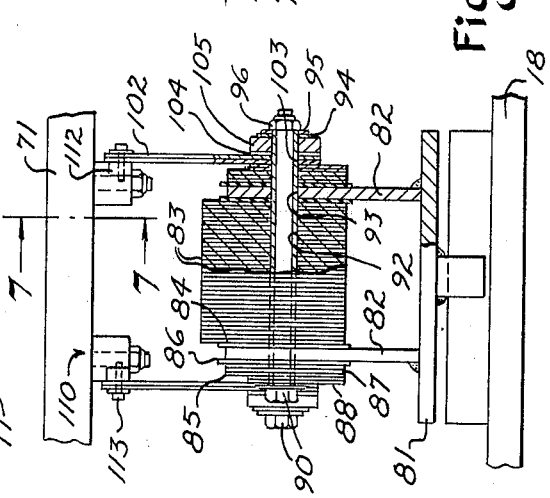

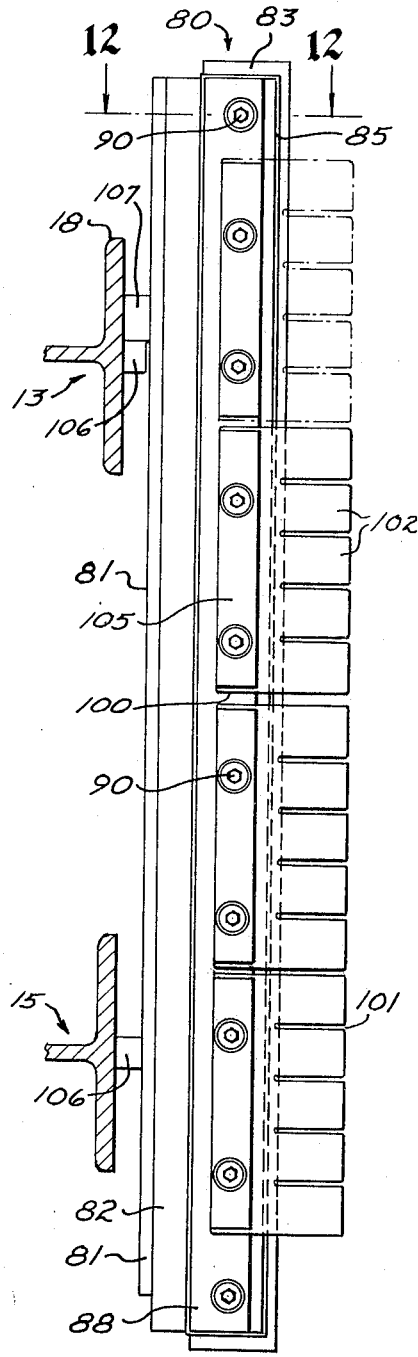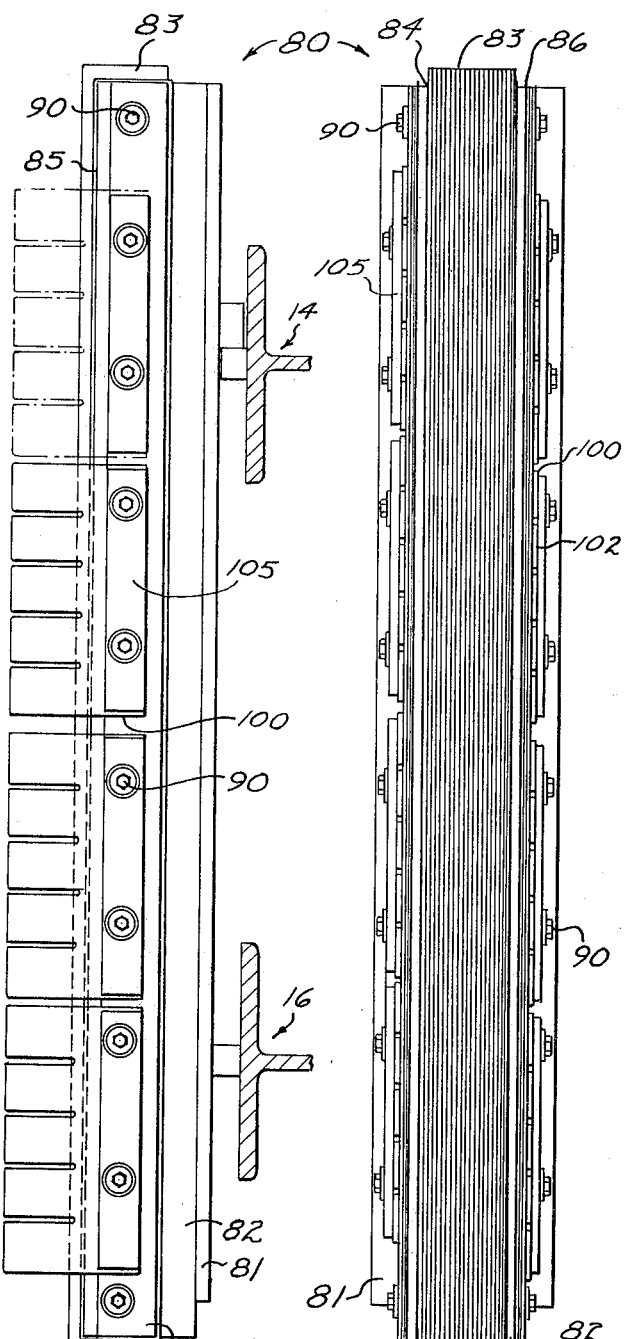
Fig. 9  Fig. 10  Fig. 11

INVENTORS
NICHOLAS V. ROSS
MARIO TAMA
BY
J. H. SLOUGH
ATTORNEY

United States Patent Office 3,485,983
Patented Dec. 23, 1969

3,485,983
APPARATUS FOR INDUCTION HEATING OF SLABS
Mario Tama, Cortland, and Nicholas V. Ross, Youngstown, Ohio, assignors to Ajax Magnethermic Corporation, Warren, Ohio, a corporation of Ohio
Filed Sept. 25, 1967, Ser. No. 670,046
Int. Cl. H05b 5/00
U.S. Cl. 219—10.57                                    18 Claims

ABSTRACT OF THE DISCLOSURE

An open-ended electric induction heater for heat-treating metal slabs, the inductor being disposed in spaced relation inwardly of a structural frame, and a refractory lining further provided in spaced relation inwardly of the inductor, the inductor and the refractory lining each being separately mounted on the frame, the winding of the inductor proceeding around the longitudinal dimension of the slab. Additionally, support means are interposed between the inductor and the frame to rigidly secure the inductor against thrust movement in a transverse direction and permit movement thereof in a longitudinal direction.

There is disclosed herein an open-ended induction heater for heat treating metal articles, such as slabs, billets, ingots of relatively large sizes.

---

This invention relates to electric heaters and relates more particularly to induction heaters of the type used in heating relatively large size metal slabs, e.g., cast steel slabs.

The present invention has particular application to the inductive heating of a static load where the load is immovable during heating and the inductor coils arranged with the greater part of the length thereof in a direction parallel with the longitudinal axis of the load and said load is substantially of greater length than width. The induction coil used in the heater of this invention is of the type set forth, described and claimed in co-pending U.S. patent application Ser. No. 589,974 filed Oct. 27, 1966, now Patent No. 3,424,886 and is referred to therein as a generally rectangular inductor.

According to the present invention, an assembly is provided whereby the inductor coils, the refractory lining, are rigidly mounted within a generally rectangular framework of heavy structural steel, each winding of the coil being separately supported by the frame. The support for said coil windings afforded by said frame is generally rigid in a transverse direction but provided with means whereby thermal expansion and contraction of the individual windings is accommodated without wear or excessive stress.

A principal object of this invention is the construction of a novel low frequency induction heater, in which a relatively long metal slab may be quickly heated to a substantial uniform heating pattern over the slab.

A further object of the invention is to provide an improved heater construction of the type referred to which may be economically operated with maximum electrical efficiency.

A still further object of the invention is to provide a heater construction which may be easily assembled and in which the inductor coil and its connections to the frame may be assembled prior to its mounting within the heater and where the refractory lining material may be quickly and easily placed within the inductor and quickly and easily replaced.

A still further object of the invention is to provide a heater of the type referred to which is adapted for use in a line of such heaters powered at different levels and heating a succession of consecutive slabs received from storage or casting equipment, heating the same to rolling mill temperatures and delivering the same to said rolling mill on demand of the mill. The heaters have inductors of the general type described, set forth and claimed in co-pending application for U.S. Letters Patent Ser. No. 589,974 filed Oct. 27, 1966, now Patent No. 3,424,886. The production line heating referred to is described, set forth and claimed in co-pending application for U.S. Letters Patent Ser. No. 670,027 filed Sept. 25, 1967.

These and other objects of the invention will appear from the following description thereof, in which description reference to the accompanying drawings is made.

In the drawings:

FIGURE 5 is an enlarged, horizontal section taken generally along the line 5—5 of FIGURE 1;

FIGURE 6 is a further enlarged, top plan view of a stud beam assembly for supporting an induction coil in the heater of this invention;

FIGURE 7 is a still further enlarged, transverse section through the coil conductor taken generally along the line 7—7 of FIGURE 6;

FIGURE 8 is a horizontal section taken generally along the line 8—8 of FIGURE 7;

FIGURE 9 is a side elevation of a stud beam assembly, enlarged with respect to FIGURE 4;

FIGURE 10 is an opposite side elevation of the stud beam assembly of FIGURE 9;

FIGURE 11 is a front elevation of the stud beam assembly of FIGURES 9 and 10;

Figure 1:
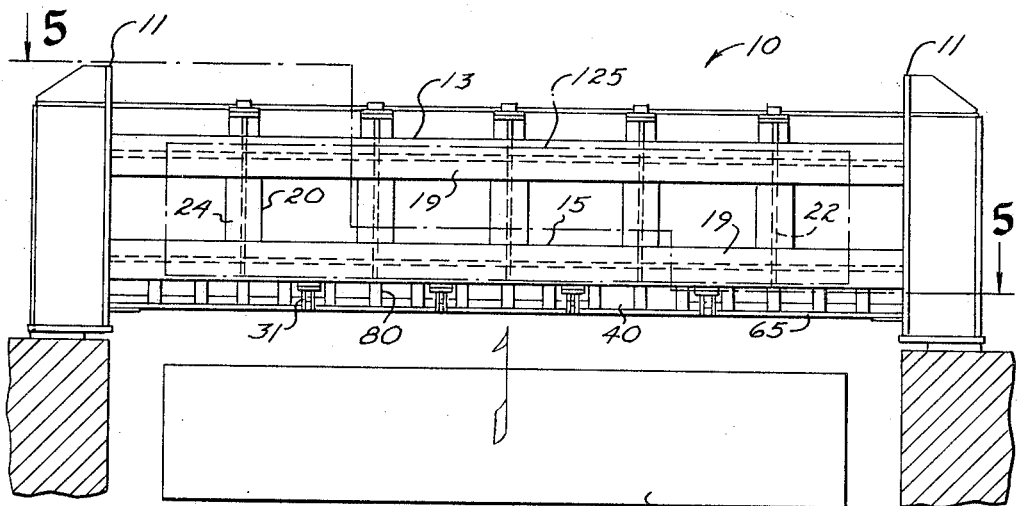
FIGURE 1 is a side elevation of the induction heater of this invention positioned over an opening in a base surface and showing a slab of metal disposed within said opening below the heater.

Referring now to the drawings, in all of which like parts are designated by like reference numerals, and particularly to FIGURES 1–5 inclusive, the induction slab heater of this invention generally comprises a heavy structural steel frame, as shown at 10 generally rectangular in form surrounding and secured in spaced relation to an induction coil of generally rectangular form, provided with a lining 46 of refractory material, said coil secured to said frame by stud beam assemblies later more fully described herein. Said frame comprises a pair of generally braced end plates 11 secured in spaced parallel relation by longitudinally extending I-beams 13–16 inclusive.

The I-beams 13–16 are substantially identical in form, each said I-beam having a horizontally disposed web, an inner vertical flange 19, and an outer vertical flange 19. The upper and lower I-beam 13 and 15 are connected together at spaced intervals along the heater by I-shaped supports 20, and the upper and lower I-beams 14 and 16 are similarly connected together at spaced intervals by I-shaped supports 21. The supports 20 and 21 are identical in form, each having a web 22 disposed transversely with respect to the heater and having vertical plates 23 disposed in planes parallel with the longitudinal dimensions of the heater and welded or otherwise suitably secured to the vertical flanges 18 and 19, respectively, of the I-beams.

The lower I-beams 15 and 16 carry a plurality of inverted, cross-sectionally T-shape members 27 and 28, each of which comprises a vertical plate portion 29 welded or otherwise suitably secured between the flanges 18 and 19 of the associated I-beam, and horizontal flanges 30 disposed just below the lowermost edges of said flanges 18 and 19. The horizontal flanges of the T-shaped members 27 and 28 carry depending support members 31 and 32 comprising vertical, downwardly, projecting plates 33 having horizontal flanges 34 disposed at the upper edges thereof. The horizontal flanges 30 and 34 are connected together in any suitable manner, such as by means of bolts 35.

Figure 4:
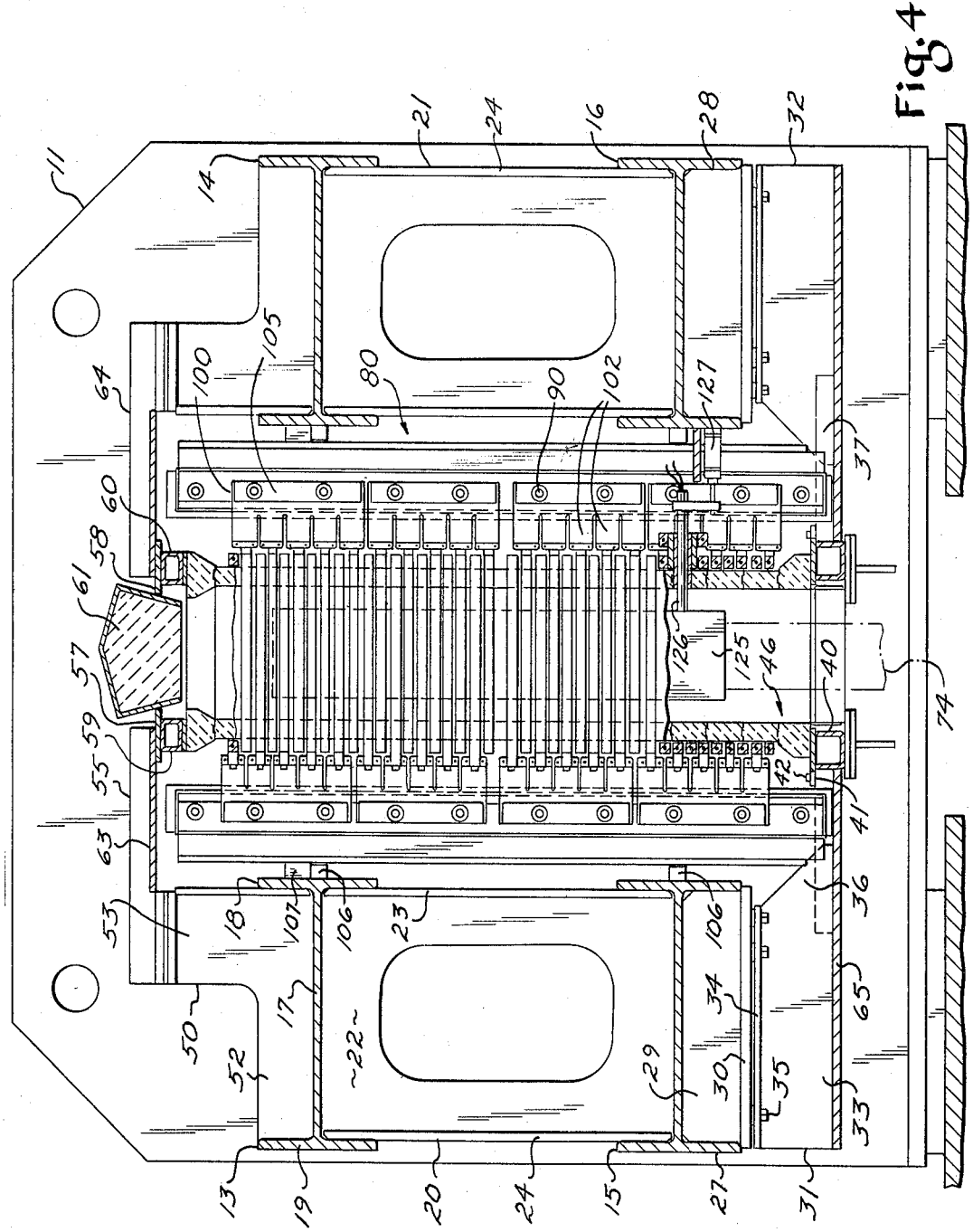
FIGURE 4 is a transverse section taken generally along the line 4—4 of FIGURE 2.

As shown in FIGURE 4, the vertical plates 33 have inwardly directed tapered portions 36 and further inwardly projecting, horizontally disposed extension members 37. Rail sections 40 and 45 form a rectangular base or support for the refractory lining of the heater generally indicated at 46 underlying the bottom course of the refractory lining and herein later fully described in detail. The inner ends of said extension members 37 are connected to elongated, box-shaped rail sections 40 which are disposed longitudinally with respect to the heater and have laterally projecting ears 41 overlapping the ends of said extension members and secured thereto by bolts 42.

The upper I-beams 13 and 14 also carry vertically disposed, L-shaped supports 50 and 51, respectively, each of which comprises an L-shaped vertical plate 52 disposed between the associated inner and outer flanges 18 and 19 and having one leg 53 of the L projecting upwardly a substantial distance above and adjacent to the inner flanges 18. The L-shaped supports 50 and 51 carry inwardly cantilevered braces 55 and 56, respectively, the inner ends of which carry narrow plates 57 and 58 which, in turn, carry box frame cover rail members 59 and 60, respectively. The rail members 59 and 60 are disposed upon the upper edge of the refractory lining 46, and the spacing between the inner edges of the narrow plates 57 and 58 is preferably closed by preferably removable cover means, such as the tapered closure member 61 of suitable refractory material shown. It will be further noted that the cantilevered braces 55 and 56 preferably carry upper heat shields 6 and 64, respectively, and that the depending support members 31 and 32 preferably carry lower heat shields 65 and 66 to protect the frame during removal or placement of a heated slab therein.

Figure 2:
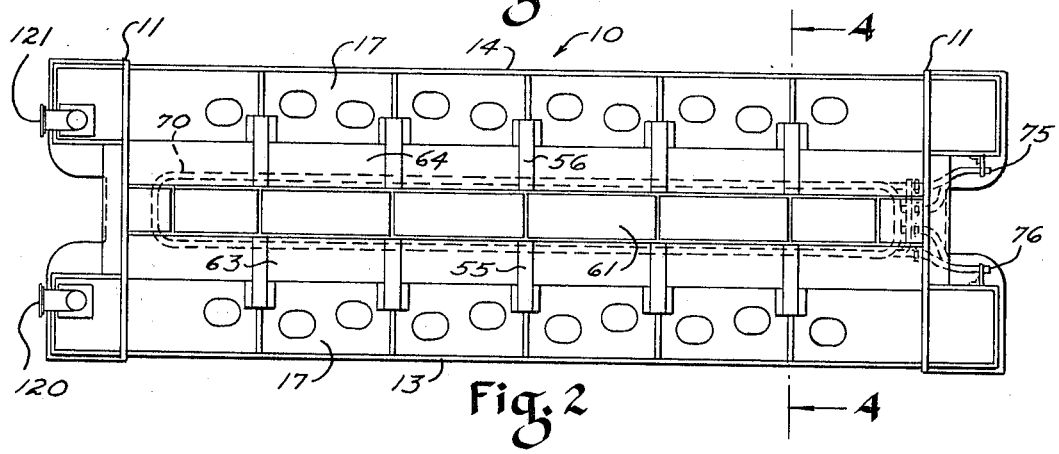
FIGURE 2 is a top plan view of the heater of this invention.
Figure 3:
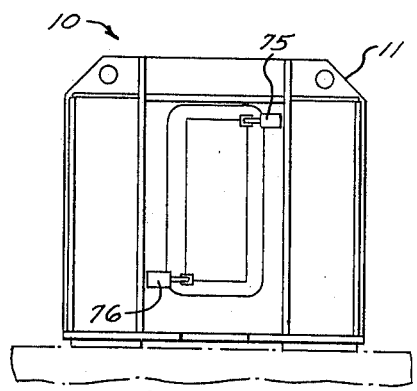
FIGURE 3 is an end elevation of the heater of this invention.

The induction slab heater 10 further comprises a heater coil 70 comprising a hollow conductor 71 of copper or like tubing having relatively thickened walls, said tubing being encased in a suitable insulation material 72, such as a fiber glass reinforced plastic. As shown in FIGURE 5, the heater coil 70 is so formed that the longitudinal axis of the conductor is disposed parallel with the longitudinal direction of the furnace with the exception of the portions thereof which complete the turns at the ends of the furnace. In other words, the conductor defines, a central coil opening which is of substantially elongated, rectangular shape wherein the conductor is wrapped or formed around the lengthwise dimension of the slab rather than around the thickness thereof, such as is commonly found in induction furnaces. The heater 10 is adapted to heat an elongated slab of the type illustrated in FIGURE 1, which slab is adapted to be placed on edge and moved upwardly by suitable hoist means 74 (shown in broken lines in FIGURE 4) into the coil 70, and to be disposed within the coil 70 with its longitudinal dimension disposed lengthwise of the heater and in parallel relation with the longitudinal axis of said conductor 71 of the said coil. The conductor 71 is energized by connecting the same to a suitable source of main or low frequency current by means of terminals 75 and 76 located preferably at one end of said heater, as illustrated in FIGURE 2. It will be readily seen that the current flow through a major portion of the conductor will be parallel with the longitudinal dimension of the slab to be heated, whereas the direction of the magnetic field will be at right angles through the width of the slab.

The heater coil assembly 70 is supported by means of a plurality of stud beam assemblies generally indicated at 80 in FIGURES 4 and 5 and shown in detail in FIGURES 6–11. Each stud beam comprises a vertically disposed support member 81 disposed adjacent to and parallel with the inner flanges 18 of the laterally spaced I-beams 13 and 16. The support member 81 is provided with a pair of vertically disposed, inwardly projecting, parallel flanges 82 which extend from the upper end of said base plate downwardly a short distance below the lower end of said base plate. A series of laminated yokes 83 of iron (high silicon steel sheet) extend in spaced relation on either side of the inductor coil and are supported by the flanges 82 by bolt means 90 disposed through adjacent pairs of said flanges. On the outside of the flanges 82 are provided a plurality of relatively narrow laminations 85 and the said laminations and spaced from said flanges by insulating spacers 84 and 86. The outer laminations 85 also consist of relatively wider lamination strips 87 and outermost relatively narrow lamination strips 88.

Figure 12:
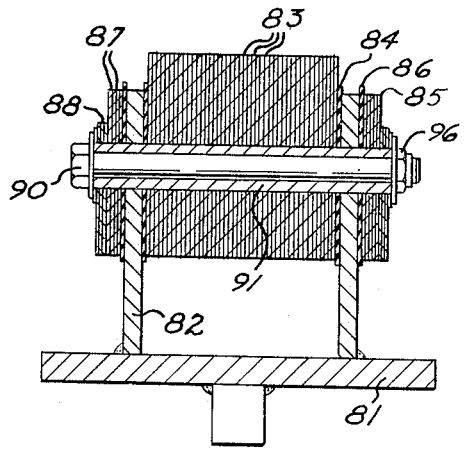
FIGURE 12 is a transverse section taken generally along the line 12—12 of FIGURE 9 and enlarged with respect thereto.

The yoke attaching bolt 90 is preferably telescoped as shown in FIGURES 6 and 12 through insulated tubing 91 which, in turn, projects through suitably aligned apertures 92 and 93 in said yokes 83 and said flanges 82, respectively. The bolt 90 is provided at either end with an insulating washer 94 disposed adjacent the lamination strips 88 and an outer, compression washer 95. A suitable nut 96 is tightened upon the bolt 90 to hold the entire lamination assembly together.

The inner flanges 18 of the I-beams 13–16 are provided with inwardly projecting, horizontal bars 106 which space the stud beam assemblies 80 from the I-beams, and each support member 81 has an outwardly projecting lug 107 disposed adjacent to its upper end and overlapping the bar 106 of an upper I-beam to support the stud beam assemblies and the coil carried thereby.

The combined effect of the plurality of yokes carried on either side of the heater coil 70 is to confine the flux field created thereby to the area closely adjacent to the coil and prevent induction heating of the furnace frame.

The heater coil 70 is supported in spaced relation to the stud beam assembly 80 by means of support members 100 carried on either side of the outer laminations 85 and projecting inwardly toward said heater coil. The support members 100 are adapted to hold the heater coil 70 rigidly with respect to movement in a vertical or transverse direction but are sufficiently flexible to allow individual longitudinal movement of the conductor windings as will herein later become apparent.

Each said support member 100 is a generally rectangular laminate of fiber glass board which is furcated to provide horizontal, uniformly spaced slots 101 opening at the inwardly directed edge of the support member and providing therebetween individually flexible portions 102. As shown in the details of FIGURE 6, and also in the side views of FIGURES 9 and 10, support members 100 are provided on either side of the stud beam assemblies 80 outwardly of the lamination strips 88, the outer edge portions of said support members being apertured at 103 to receive the bolt 90 and insulating tube 91. Gaskets 104 and clamp plates 105 are disposed outwardly of the support members 100, and the bolts 90 securely hold them in place.

The support members 100 are arranged whereby the flexible portions 102 on one side of the stud beam assembly are vertically offset with respect to the flexible portions on the opposite side of said stud beam assembly. The flexible portions of each said support member are provided to be secured to the turns of the heater coil 70, and the staggered relationship of the support members on either side of the stud beam assembly are such that every turn of the heater coil is carried by a flexible portion 102 of a given stud beam assembly either by a support member on one side of said assembly or by a support member on the other side thereof.

The means of attachment for the coil is detailed in FIGURES 7 and 8 and comprises a bracket 110 carried adjacent to the distal end of each flexible portion 102. Each bracket comprises a central body portion 111 having vertically, upwardly and downwardly projecting ears 112 which are secured to a flexible portion by bolts 113. The body portion 111 has a through bore 114 adapted to receive a stud bolt 115 brazed or otherwise fixedly secured to the conductor 71. The stud bolts on adjacent turns of the coil are arranged in staggered relation.

Figure 13:
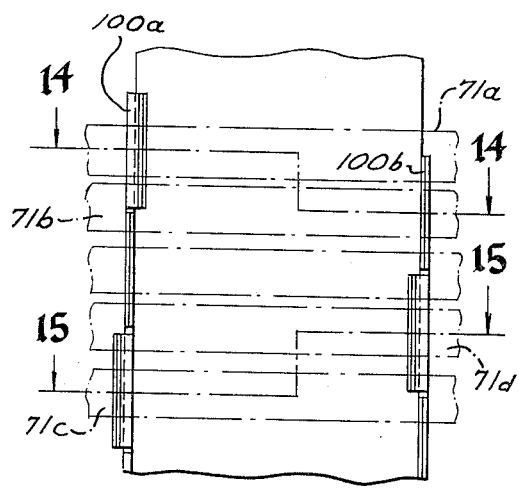
FIGURE 13 is a simplified front elevation of a portion of a stud beam assembly showing parts thereof in different operative positions.
Figure 14:
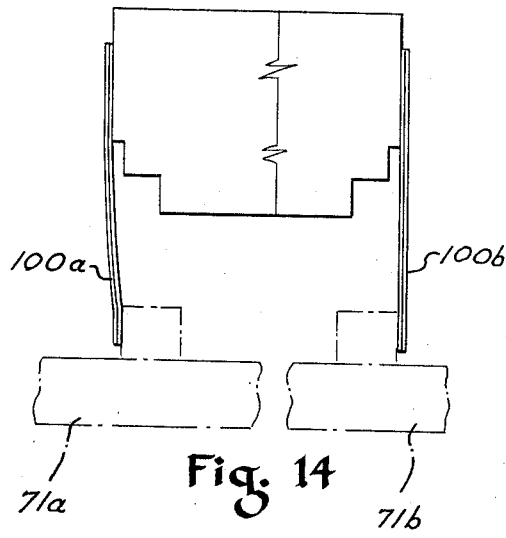
FIGURE 14 is a transverse section taken generally along the line 14—14 of FIGURE 13.
Figure 15:
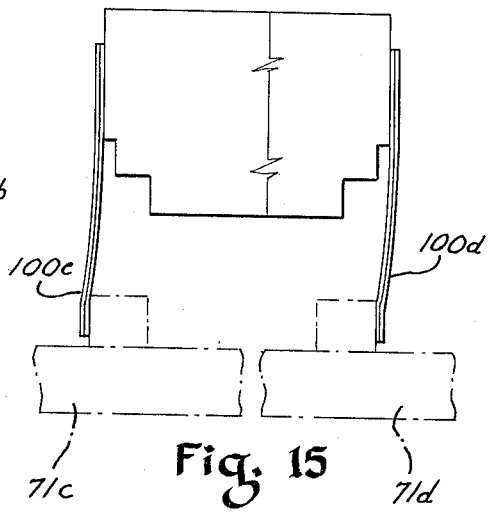
FIGURE 15 is a transverse section taken generally along the line 15—15 of FIGURE 13.

The laminated support members 100 provide a transversely rigid, longitudinally movable connection between each of the coil windings and the frame whereby each winding or turn of the inductor can move longitudinally with respect to the heater frame and with respect to the other turns of the conductor when current is applied thereto. FIGURES 13-15 illustrate this feature of the construction in very simplified form. In FIGURE 14, a support member 100a is shown bent slightly to the right due to the movement of a conductor portion 71a whereas a second support member 100b is shown in the straight or unflexed position supporting a conductor portion 71b. As shown in FIGURE 13, it will be noted that the conductor portion 71a is part of a turn of the coil disposed above the portion 71b which is part of a separate turn of the coil. In FIGURE 15, a support member 100c carrying a conductor portion 71c is moved to the left while a support member 100d carrying a lower conductor portion 71b is also bent toward the left.

The induction coil windings as shown in FIGURE 7 are tubular whereby a suitable liquid coolant, such as water, can be circulated therethrough. As shown in FIGURE 5, the left hand end of the heater frame is provided with an inlet pipe 120 and an outlet pipe 121 for directing the aforesaid fluid in any suitable manner to taps 122 or the heater coil 70.

In the form of the invention herein illustrated, an elongated slab 125 is positioned below the heater 10, said slab being disposed on one side edge thereof and having its longer dimension horizontally directed. The slab 125 is adapted to be raised upwardly into the heater coil 70 by the hoist and support means shown at 74 in broken lines. A suitable thermocouple 126 may be moved inwardly against the slab 125 by an air cylinder 127, said thermocouple being connected to suitable control means for regulating the heating of the slab.

Figures 16, 17:
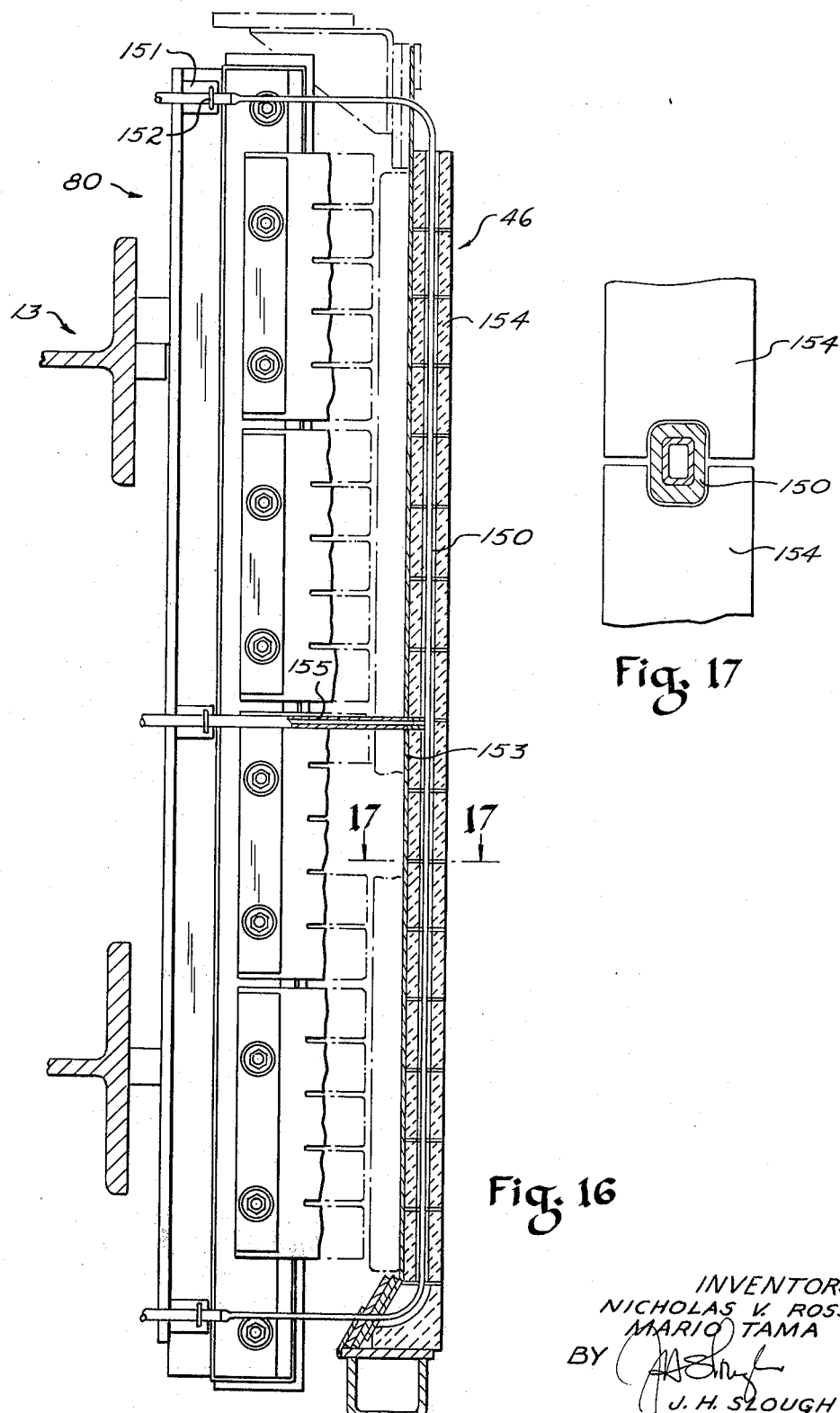
FIGURE 16 is a vertical view partly in section of the refractory lining of the heater of this invention.
FIGURE 17 is a sectional view taken along the line 17—17 of FIGURE 16.

In the heater of this invention, as illustrated in FIGURES 16 and 17, the ceramic lining 46 is provided with a plurality of vertically extending tubular support rods 150, which are adapted to be secured as shown at 151 to the stud beam assemblies 80 as by hook or bracket means such as indicated at 152 and a centrally disposed tie rod 155 may further be secured to said stud beam assembly and to said tubing, as shown. Said rods, which are preferably formed of copper tubing, are preferably water cooled to retain the strength of the tubing, wherefor the refractory which is comprised of separate courses of bricks, the bricks 154 in each of the courses being uncemented or otherwise secured together, is adapted to withstand without deterioration the heat generated in the slabs being heated in the induction heater. As shown in FIGURE 16, an insulating lining 153 may be disposed between the heating coil and the refractory lining 46 and it is to be noted that the heater coil is spaced from the refractory lining and is not secured thereto.

The present invention has been disclosed in connection with one preferred embodiment thereof and has particular application, to electrically inductively heating metal slabs, delivered thereto, to millworking temperatures, said slabs being delivered in synchronism with a predetermined working cycle by said slab hoist and support to the induction heater located above said hoist and support and removed therefrom and placed out of alignment with said inductor to allow another slab to be hoisted on edge within said inductor.

It will be understood that many changes in the details of the invention may be made without, however, departing from the spirit thereof or the scope of the appended claims.

What I claim is:

1. In an open-ended electrical induction heater for statically heating metal slabs on edge, an inductor comprising a number of coil turns each comprising two relatively long conductors and two relatively short end conductors, a structural frame disposed outwardly from said inductor, refractory lining consisting of independent courses of brick disposed inwardly from said inductor, the long conductors of said inductor being secured to said structural frame, means for securing said refractory lining to said frame in spaced relationship to the said inductor said relatively long conductors being disposed substantially parallel to the longest dimension of said slab.

2. Apparatus according to claim 1 in which said heater is of relatively greatest extent in its longitudinal dimension, positioning and support means positioning and holding said slab on edge in predetermined fixed spaced relation within said inductor during heat, the said positioning and support means moving the slab into and out of the inductor through said open end of the heater.

3. Apparatus according to claim 2 wherein the positioning and support means are movable vertically through an open bottom of said heater.

4. A heater according to claim 1 wherein insulating means support each turn of the coil throughout its length and electrically isolate it from other turns of the inductor and the frame of the heater.

5. A heater according to claim 1, wherein each turn of the inductor coil is individually insulated.

6. Apparatus according to claim 1, wherein second support means are secured to and interposed between said inductor and said frame, said second support means being relatively rigid in a transverse direction and adapted to flex to permit longitudinal movement of the inductor windings by thermal expansion and contraction.

7. Apparatus as claimed in claim 1, wherein said support means comprises plastic members, said plastic members being rigidly secured to the inductor coil at spaced intervals, each said plastic member secured to frame members.

8. In an open-ended electrical induction heater for heating metal slabs, an inductor, a structural frame disposed outwardly from said inductor, refractory lining disposed inwardly from said inductor, said inductor being mounted upon said structural frame, said refractory lining being mounted upon said frame, the winding of said inductor proceeding around the longitudinal dimension of said metal slab being heated therein, support means mounted on laminated iron yokes, said yokes being disposed vertically in spaced relation to the inductor and supported by said frame, said support means comprising plastic members, said plastic members being rigidly secured to the inductor coil at spaced intervals securing the inductor against movement in a transverse direction and permitting the longitudinal movement of the inductive winding.

9. Apparatus as claimed in claim 8 wherein said plastic members consist of fiber glass laminated strips.

10. Apparatus as claimed in claim 8, wherein said plastic members consisting of fiber glass laminated strips, said strip being furcated wherefor separate end sections thereof are connected to separate of said inductor windings and are independently movable in a longitudinal direction to accommodate expansion or contraction thereof.

11. Apparatus according to claim 8, wherein the said support tubes are disposed in spaced parallel relationship.

12. An open-ended electrical induction heater according to claim 1, wherein cooling means for cooling said support tubes are provided.

13. An induction heater according to claim 1 wherein the refractory lining comprises aligned courses of individual blocks of refractory material, each of said blocks being independently movable during heating.

14. In an open-ended electrical induction heater for heating metal slabs, an inductor, a structural frame disposed outwardly from said inductor, refractory lining disposed inwardly from said inductor, said inductor being mounted upon said structural frame, said refractory lining being mounted upon said frame, the winding of said inductor proceeding around the longitudinal dimension of said metal slab being heated therein, the refractory lining comprising aligned courses of individual blocks of refractory material, each of said blocks being independently movable during heating, each of said blocks provided with a centrally disposed notch at either end thereof, said blocks being aligned whereby refractory support tubes are adapted to be threaded therethrough.

15. In an open-ended electrical induction heater for heating metal slabs, an inductor comprising a number of coil turns each comprising two longitudinally disposed relatively long conductors and two relatively short end conductors, a structural frame disposed outwardly and spaced from said inductor, non-metallic plate support means interposed between said inductor and said frame securing the long conductors of said inductor to said structural frame, said support means including flexible portions securing the conductors against thrust movement in a transverse direction while permitting movement in a longitudinal direction of said long conductors.

16. In an induction heater as claimed in claim 15 wherein a plurality of said support means secures said inductor to said structural frame.

17. An induction heater as claimed in claim 15 wherein said flexible portions securing said inductor to said structural frame are furcated members.

18. In an open ended electrical induction heater according to claim 1 wherein a plurality of refractory support tubes disposed perpendicular to said inductor windings are threaded through said refractory lining.

References Cited

UNITED STATES PATENTS

| | | | |
|---|---|---|---|
| 2,750,486 | 6/1956 | Howell | 219—10.67 |
| 2,291,862 | 8/1942 | Bailey | 219—10.57 X |
| 2,780,706 | 2/1957 | Brogan | 219—10.67 |
| 2,875,995 | 3/1959 | Troglione | 263—6 |
| 2,888,541 | 5/1959 | Netzer | 219—10.79 X |
| 2,950,374 | 8/1960 | Lombard | 219—10.67 |
| 2,978,237 | 4/1961 | Frank | 263—6 |
| 3,188,440 | 6/1965 | Wohas | 219—10.79 X |
| 2,852,650 | 9/1958 | DeCoriolis et al. | 219—10.67 |

JOSEPH V. TRUHE, Primary Examiner

L. H. BENDER, Assistant Examiner

U.S. Cl. X.R.

219—10.67, 10.69